United States Patent
Watanabe et al.

(10) Patent No.: US 12,498,009 B2
(45) Date of Patent: Dec. 16, 2025

(54) FRICTION MATERIAL

(71) Applicant: AKEBONO BRAKE INDUSTRY CO., LTD., Tokyo (JP)

(72) Inventors: Yuta Watanabe, Tokyo (JP); Motoyuki Miyaji, Tokyo (JP); Hiroshi Yamamoto, Tokyo (JP); Takuya Takada, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 810 days.

(21) Appl. No.: 17/440,242

(22) PCT Filed: Mar. 16, 2020

(86) PCT No.: PCT/JP2020/011572
§ 371 (c)(1),
(2) Date: Sep. 17, 2021

(87) PCT Pub. No.: WO2020/189649
PCT Pub. Date: Sep. 24, 2020

(65) Prior Publication Data
US 2022/0010857 A1 Jan. 13, 2022

(30) Foreign Application Priority Data

Mar. 20, 2019 (JP) .................................. 2019-053713

(51) Int. Cl.
*F16D 69/02* (2006.01)
(52) U.S. Cl.
CPC .... *F16D 69/026* (2013.01); *F16D 2200/0065* (2013.01)
(58) Field of Classification Search
None
See application file for complete search history.

(56) References Cited

U.S. PATENT DOCUMENTS

| | | |
|---|---|---|
| 4,944,373 A | 7/1990 | Ohya et al. |
| 5,049,191 A | 9/1991 | Pflug et al. |
| 2010/0331447 A1* | 12/2010 | Schoo ................... F16D 69/025 523/157 |
| 2015/0192182 A1 | 7/2015 | Yamamoto et al. |
| 2016/0289442 A1* | 10/2016 | Takada .................... C08L 61/06 |
| 2017/0022355 A1* | 1/2017 | Becquet .................. C08L 61/06 |
| 2018/0142748 A1 | 5/2018 | Kobayashi et al. |
| 2018/0291974 A1* | 10/2018 | Kesavan ............... F16D 69/026 |

FOREIGN PATENT DOCUMENTS

| | | |
|---|---|---|
| CN | 1894518 A | 1/2007 |
| CN | 108679129 A | 10/2018 |
| CZ | 283 696 B6 | 6/1998 |
| EP | 0399728 A2 | 11/1990 |
| JP | H03-054298 A | 3/1991 |
| JP | 2000-256651 A | 9/2000 |
| JP | 2000256651 * | 9/2000 |
| JP | 2006 125618 * | 5/2006 |
| JP | 2006-125618 A | 5/2006 |
| JP | 2014-012766 A | 1/2014 |
| JP | 2017-008167 A | 1/2017 |
| WO | WO-95/002657 A1 | 1/1995 |
| WO | WO-2005057042 A2 * | 6/2005 ........... F16D 69/025 |

OTHER PUBLICATIONS

Machine translation of Murayama et al. JP 2006 125618 (Year: 2006).*
Machine translation of Steinmetz (WO 2005057042) (Year: 2005).*
Machine translation of Kiuchi et al. JP 20000/256651 (Year: 2000).*
The First Office Action issued Mar. 25, 2022 in Chinese Patent Application No. 202080022386.X (9 pages) with an English translation (8 pages).
Extended European Search Report issued Oct. 14, 2022 in EP Application No. 20774461.6.
International Search Report mailed Jun. 16, 2020 for PCT/JP2020/011572.
Written Opinion mailed Jun. 16, 2020 for PCT/JP2020/011572.

* cited by examiner

*Primary Examiner* — Robert T Butcher
(74) *Attorney, Agent, or Firm* — Faegre Drinker Biddle & Reath LLP

(57) ABSTRACT

A friction material includes a friction modifier, a binder, and a fibrous material. An alkali metal salt of phosphoric acid and a metal sulfide are contained as the friction modifier. The alkali metal salt of phosphoric acid may include trisodium phosphate. A wax containing, as a main component, an ester of a higher fatty acid and a higher alcohol may be contained as the friction modifier.

18 Claims, No Drawings

FRICTION MATERIAL

TECHNICAL FIELD

The present invention relates to a friction material used in automobiles, railroad vehicles, industrial machines and the like.

BACKGROUND ART

It is known that a phenomenon in which a friction material and a rotor in a brake are stuck to each other by rust due to moisture (hereinafter, may be referred to as "seizure due to corrosion phenomenon") occurs after leaving an automobile in a high humidity environment where dew condensation occurs in the rain or early morning, or after leaving the automobile after washing.

Therefore, various friction materials that can prevent the seizure due to corrosion phenomenon have been proposed. For example, Patent Literature 1 discloses a friction material containing a fibrous material, a binder, and a friction modifier and obtained by molding a friction material composition of a NAO material containing at least one raw material for eluting a sulfate ion, in which the friction material composition contains hydrophilic activated carbon as the friction modifier.

In addition, it is known that when driving an automobile, an unpleasant abnormal noise is generated in the process of releasing the brake by loosening a brake pedal after stopping by a service brake. This abnormal noise is called creep groan. The creep groan is considered to be caused by moisture, because of being more likely to occur after the automobile has been left in a high humidity environment such as rain or early morning.

Therefore, various friction materials that can prevent the creep groan have been proposed. For example, Patent Literature 2 discloses a non-asbestos friction material containing a fibrous material, a binder, a lubricant, an inorganic friction modifier, a pH adjuster, and a filler as compounding materials, in which at least one of the filler and the inorganic friction modifier is coated with at least one of a fatty acid and a metal soap.

CITATION LIST

Patent Literature

Patent Literature 1: JP-A-2014-12766
Patent Literature 2: JP-A-2017-8167

SUMMARY OF INVENTION

Technical Problem

As described above, a friction material that can solve either the seizure due to corrosion phenomenon or the creep groan has been proposed, but a friction material that can solve the seizure due to corrosion phenomenon and the creep groan at the same time is not known.

For example, when the brake is applied from a high speed, the friction material is brought to a high temperature, but Patent Literature 1 does not study the seizure due to corrosion phenomenon after the friction material has undergone a high temperature heat history (for example, about 400° C. at a mating material temperature).

The present invention has been made in view of the above circumstances, and an object thereof is to provide a friction material that can prevent occurrence of a seizure due to corrosion phenomenon even when the friction material has undergone a high temperature heat history (for example, about 400° C. at a mating material temperature), and can also prevent occurrence of creep groan.

Solution to Problem

As a result of intensive studies, the present inventors have invented that the above problems can be solved when the friction material contains, as a friction modifier, an alkali metal salt of phosphoric acid and a metal sulfide. Thus, the present invention has been completed.

That is, the present invention relates to the following <1> to <6>.

<1> A friction material containing: a friction modifier; a binder; and a fibrous material, wherein an alkali metal salt of phosphoric acid and a metal sulfide are contained as the friction modifier.

<2> The friction material according to <1>, wherein the alkali metal salt of phosphoric acid includes trisodium phosphate.

<3> The friction material according to <1> or <2>, wherein a wax containing, as a main component, an ester of a higher fatty acid and a higher alcohol is contained as the friction modifier.

<4> The friction material according to any one of <1> to <3>, wherein a steel fiber is contained as the fibrous material.

<5> The friction material according to <4>, wherein a content of the steel fiber is 20 mass % to 50 mass %.

<6> The friction material according to any one of <1> to <5>, wherein a content of a copper component is 0.5 mass % or less in a copper element equivalent.

Advantageous Effects of Invention

According to the present invention, it is possible to provide a friction material that can prevent occurrence of a seizure due to corrosion phenomenon even when the friction material has undergone a high temperature heat history (for example, about 400° C. at a mating material temperature), and can also prevent occurrence of creep groan.

DESCRIPTION OF EMBODIMENTS

Hereinafter, the present invention will be described in detail, but these show examples of desirable embodiments, and the present invention is not specified in these contents.

A friction material of the present invention contains: a friction modifier; a binder; and a fibrous material.

Hereinafter, each component will be described in detail.

Friction Modifier

The friction material of the present invention contains, as the friction modifier, an alkali metal salt of phosphoric acid and a metal sulfide.

Alkali Metal Salt of Phosphoric Acid

In a case where the alkali metal salt of phosphoric acid is contained in the friction material of the present invention, when moisture comes into contact with the friction material, the moisture reacts with the alkali metal salt of phosphoric acid in the friction material. It is considered that the alkali metal salt of phosphoric acid containing moisture by the reaction exhibits a corrosion resistance effect because of exhibiting basicity, and can prevent occurrence of a seizure due to corrosion phenomenon and occurrence of creep groan, which are caused by the moisture.

Examples of the alkali metal salt of phosphoric acid include trisodium phosphate, disodium hydrogen phosphate, tripotassium phosphate, and dipotassium hydrogen phosphate. Among these, trisodium phosphate is preferred from the viewpoint of reactivity with the moisture.

The content of the alkali metal salt of phosphoric acid in the entire friction material is preferably 0.1 mass % to 12 mass %, more preferably 0.5 mass % to 10 mass %, and still more preferably 1.0 mass % to 8 mass %. When the content of the alkali metal salt of phosphoric acid is 0.1 mass % or more, the alkali metal salt of phosphoric acid can sufficiently react with the moisture in contact with the friction material, so that it is easy to prevent the occurrence of the seizure due to corrosion phenomenon and the occurrence of the creep groan. When the content of the alkali metal salt of phosphoric acid is 12 mass % or less, it is possible to prevent a yield of the friction material from deteriorating.

The median diameter of the alkali metal salt of phosphoric acid is preferably 1 μm to 200 μm, more preferably 3 μm to 150 and still more preferably 5 μm to 100 When the median diameter of the alkali metal salt of phosphoric acid is 1 μm or more, the reaction with the moisture is improved. When the median diameter of the alkali metal salt of phosphoric acid is 200 μm or less, the moldability of the friction material is improved, and the mechanical strength can be improved.

The median diameter is a particle diameter equivalent to a cumulative percentage of 50% on a volume basis, and can be measured by a nanoparticle size distribution measuring device.

Metal Sulfide

When the metal sulfide is contained in the friction material of the present invention, the strength of a friction surface at high temperature is improved and the deterioration of the friction surface is prevented. Therefore, it is considered that the combined use of the alkali metal salt of phosphoric acid and the metal sulfide is effective in preventing the occurrence of the seizure due to corrosion phenomenon, especially after undergoing a high temperature heat history.

Examples of the metal sulfide include tin (I) sulfide (SnS), tin (IV) sulfide ($SnS_2$), antimony trisulfide, and molybdenum disulfide. Among these, tin (IV) sulfide is preferred from the viewpoint of reducing environmental contamination.

The content of the metal sulfide in the entire friction material is preferably 0.1 mass % to 10 mass %, more preferably 0.5 mass % to 9 mass %, and still more preferably 1.0 mass % to 8 mass %. When the content of the metal sulfide is 0.1 mass % or more, it is possible to prevent the friction material from sticking to a rotor which is a mating material. When the content of the metal sulfide is 10 mass % or less, adhesion of a metal derived from the rotor (metal catch) to a sliding surface of the friction material can be prevented.

The median diameter of the metal sulfide is preferably 1 μm to 100 more preferably 3 μm to 70 and still more preferably 5 μm to 50 When the median diameter of the metal sulfide is 1 μm or more, the lubricity of the friction material is improved and the aggressiveness against the mating material can be prevented. When the median diameter of the metal sulfide is 100 μm or less, the friction coefficient at high speed and high load braking can be maintained.

The median diameter is a particle diameter equivalent to a cumulative percentage of 50% on a volume basis, and can be measured by a nanoparticle size distribution measuring device.

Wax Containing, as Main Component, Ester of Higher Fatty Acid and Higher Alcohol The friction material of the present invention contains, as the friction modifier, a wax (hereinafter, may be referred to as "wax A") containing, as a main component, an ester of a higher fatty acid and a higher alcohol.

When the friction material has friction against the rotor, which is a mating material, an abrasion powder is generated. When the friction material of the present invention contains the wax A, the wax A softens or melts due to frictional heat generated by friction during braking, and coats an abrasion powder containing an iron component derived from the rotor and the surface of the rotor. As a result, it is considered that the influence of moisture on the friction surface among particles of the abrasion powder, the friction material and the rotor is prevented, and the occurrence of the rust adhesion phenomenon is prevented.

In addition, since the wax A has water repellency, when the friction material of the present invention contains the wax A, moisture absorption of the friction surface of the friction material is prevented, and the abrasion powder is coated with the wax A. Therefore, it is considered that the friction material of the present invention is a friction material having stable friction characteristics even in a low temperature and high humidity environment by preventing a cohesive force of an abrasion powder aggregate from being strengthened due to the influence of the moisture.

The wax A contains, as a main component, an ester (hereinafter, may be referred to as "ester B") of a higher fatty acid and a higher alcohol. In the present invention, the above "main component" means that the content of the ester B in the wax A is 50 mass % or more, preferably 70 mass % or more, and more preferably 80 mass % or more.

The ester B can be obtained from a higher fatty acid and a higher alcohol by known methods. For example, the higher fatty acid and the higher alcohol may be subjected to a dehydration condensation reaction in the presence of a dehydrating agent.

In the present invention, the higher fatty acid means a saturated or unsaturated fatty acid having 10 or more carbon number. From the viewpoint of obtaining a wax A having a suitable melting point, the carbon number is preferably 12 or more, more preferably 14 or more, and is preferably 45 or less, and more preferably 40 or less. The higher fatty acid may be linear, branched or cyclic.

Specific examples of the higher fatty acid include cerotic acid, palmitic acid, behenic acid, lignoceric acid, lauric acid, myristic acid, stearic acid, undecylenic acid, oleic acid, linoleic acid, linolenic acid, arachidonic acid, eicosapentaenoic acid (EPA), and docosahexaenoic acid (DHA). Among these, cerotic acid, palmitic acid, behenic acid, and lignoceric acid are preferred from the viewpoint of coating performance on the abrasion powder and the surface of the rotor.

In the present invention, the higher alcohol means a saturated or unsaturated alcohol having 6 or more carbon number. From the viewpoint of obtaining a wax A having a suitable melting point, the carbon number is preferably 10 or more, more preferably 20 or more, and is preferably 50 or less, and more preferably 40 or less. The higher alcohol may be linear, branched or cyclic.

Specific examples of the higher alcohol include myricyl alcohol, 1-hexacosanol, triacontanol, lauryl alcohol, myristyl alcohol, cetyl alcohol, icosanol, dodecanol, ficeteryl alcohol, zomarin alcohol, oleyl alcohol, gadrail alcohol, icosenol, docosenol, and lanolin alcohol. Among these, myricyl alcohol, 1-hexacosanol, and triacontanol are preferred from the viewpoint of coating performance on the abrasion powder and the surface of the rotor.

Examples of the ester B include a wax ester.

In addition to the ester B, the wax A may contain, for example, a free fatty acid (non-esterified fatty acid), a free alcohol (non-esterified alcohol), a hydrocarbon, a resin, and a lactone.

The carbon number in the free fatty acid or the free alcohol is, for example, 10 to 40, and preferably 15 to 35. The carbon number in the hydrocarbon is, for example, 10 to 40, and preferably 15 to 35.

The wax A can be produced by mixing and agitating the above components at, for example, 100° C. to 250° C. Further, as the wax A, a naturally derived wax A can be used. Among these, from the viewpoint of reducing the environmental load, it is preferable to use a naturally derived wax A.

Examples of the naturally derived wax A include carnauba wax and rice wax, and a powdered wax A is desirable.

The carnauba wax is obtained from the palm tree of the palm family, which originates in northern Brazil. The rice wax is obtained by refining the wax separated when refining rice oil extracted from rice bran.

The melting point of wax A is preferably 65° C. to 105° C., more preferably 75° C. to 95° C., and still more preferably 80° C. to 90° C. When the melting point of the wax A is 65° C. or higher, the material does not have an adverse influence such as adhesion to a wall of a mixer or the like during material mixing and agitating in a process of producing the friction material. In addition, when the melting point of the wax A is 65° C. or higher, under braking conditions where a braking load is small due to a regenerative cooperation brake or the like, the temperature of the friction surface between the friction material and the rotor does not easily rise. When the melting point of the wax A is 105° C. or lower, the wax A softens or melts even under the braking conditions where the braking load is small, and the occurrence of the seizure due to corrosion phenomenon is likely to be prevented.

The content of the wax A in the entire friction material is preferably 0.1 mass % to 6 mass %, more preferably 0.2 mass % to 5 mass %, and still more preferably 0.4 mass % to 4 mass %. When the content of the wax A is 0.1 mass % or more, the occurrence of the rust adhesion phenomenon is likely to be prevented, and the occurrence of the creep groan is also likely to be prevented. When the content of the wax A is 6 mass % or less, it is possible to prevent the friction material from expanding due to heat.

Other Friction Modifiers

Other friction modifiers are used to impart desired friction characteristics such as abrasion resistance, heat resistance, and fade resistance to the friction material.

Examples of the other friction modifiers include an inorganic filler, an organic filler, an abrasive, and a solid lubricant.

Examples of the inorganic filler include inorganic materials such as a titanate salt, barium sulfate, calcium carbonate, calcium hydroxide, vermiculite, and mica, and metal powders of aluminum, tin and zinc. These inorganic fillers can be used alone or in combination of two or more thereof.

Examples of the organic filler include various rubber powders (raw rubber powder, tire powder, etc.), cashew dust, tire tread, and melamine dust. These organic fillers can be used alone or in combination of two or more thereof.

Examples of the abrasive include alumina, silica, magnesium oxide, zirconia, zirconium silicate, chromium oxide, triiron tetraoxide ($Fe_3O_4$), and chromate. These abrasives can be used alone or in combination of two or more thereof.

Examples of the solid lubricant include graphite and polytetrafluoroethylene (PTFE). These solid lubricants can be used alone or in combination of two or more thereof.

The friction modifier is preferably used in an amount of 30 mass % to 70 mass %, and more preferably 40 mass % to 60 mass %, based on the entire friction material, from the viewpoint of sufficiently imparting the desired friction characteristics to the friction material.

Binder

As the binder, various commonly used binders can be used. Specific examples thereof include phenol resins, various elastomer-modified phenol resins, and thermosetting resins such as a melamine resin, an epoxy resin and a polyimide resin.

Examples of the elastomer-modified phenol resin include an acrylic rubber-modified phenolic resin, a silicone rubber-modified phenolic resin, and a nitrile rubber (NBR)-modified phenolic resin. These binders can be used alone or in combination of two or more thereof.

From the viewpoint of moldability of the friction material, the binder is preferably used in an amount of 1 mass % to 20 mass %, and more preferably 3 mass % to 15 mass %, based on the entire friction material.

Fibrous Material

As the fibrous material, various commonly used fibrous materials can be used. Specific examples thereof include an organic fiber, an inorganic fiber, and a metal fiber.

Examples of the organic fiber include an aromatic polyamide (aramid) fiber and a flame-resistant acrylic fiber.

Examples of the inorganic fiber include a biosoluble inorganic fiber, a ceramic fiber, a glass fiber, a carbon fiber, and rock wool. Examples of the biosoluble inorganic fiber include biosoluble ceramic fibers such as a $SiO_2$—CaO—MgO-based fiber, a $SiO_2$—CaO—MgO—$Al_2O_3$-based fiber, a $SiO_2$—MgO—SrO-based fiber, and biosoluble rock wool.

Examples of the metal fiber include a steel fiber. These fibrous materials can be used alone or in combination of two or more thereof.

Among these, a steel fiber is preferred from the viewpoint of ensuring the strength of the friction material at high temperature.

When the friction material of the present invention contains a steel fiber, the content of the steel fiber in the entire friction material is preferably 20 mass % to 50 mass %, more preferably 20 mass % to 45 mass %, and still more preferably 20 mass % to 40 mass %. When the content of the steel fiber is 20 mass % or more, sufficient wear resistance is likely to be obtained. When the content of the steel fiber is 50 mass % or less, the friction material can contain the friction modifier and the binder each in a sufficient amount.

The average fiber length of the steel fiber is preferably 0.5 mm to 30 mm, more preferably 0.5 mm to 20 mm, and still more preferably 0.5 mm to 10 mm.

When the average fiber length of the steel fiber is 0.5 mm or more, the strength of the friction material can be ensured. When the average fiber length of the steel fiber is 30 mm or less, deterioration due to the aggressiveness against the mating material can be prevented.

The average fiber diameter of the steel fiber is preferably 10 μm to 600 μm, more preferably 30 μm to 500 μm, and still more preferably 50 μm to 400 μm.

When the average fiber diameter of the steel fiber is 10 μm or more, the strength of the friction material can be ensured. When the average fiber diameter of the steel fiber is 600 μm or less, deterioration due to the aggressiveness against the mating material can be prevented.

The average fiber length and the average fiber diameter of the steel fiber can be measured by observing with a microscope or the like.

From the viewpoint of ensuring sufficient strength of the friction material, the fibrous material is preferably used in an amount of 5 mass % to 60 mass %, and more preferably 10 mass % to 60 mass %, based on the entire friction material.

The content of a copper component in the entire friction material of the present invention is preferably 0.5 mass % or less in a copper element equivalent, and more preferably the copper component is not contained, from the viewpoint of reducing the environmental load.

Method for Producing Friction Material

The friction material of the present invention can be produced by a known production process. For example, the friction material can be produced by blending the above components, and subjecting the blended material to steps such as preforming, hot molding, heating, and grinding according to a usual production method.

A method for producing a brake pad provided with the friction material generally includes the following steps.

(a) a step of forming a pressure plate into a predetermined shape by using a sheet metal press (b) a step of applying a degreasing treatment, a chemical conversion treatment and a primer treatment to the pressure plate and coating the pressure plate with an adhesive (c) a step of blending raw materials such as a friction modifier, a binder and a fibrous material, sufficiently homogenizing by mixing, and performing molding at a predetermined pressure at room temperature to prepare a preformed body (d) a thermal molding step of integrally fixing the preformed body and the pressure plate coated with the adhesive by applying a predetermined temperature and pressure (molding temperature: 130° C. to 180° C., molding pressure: 30 MPa to 80 MPa, molding time: 2 minutes to 10 minutes), and (e) a step of performing after-cure (150° C. to 300° C., 1 hour to 5 hours) and finally performing finishing treatments such as grinding, scorching, and painting.

EXAMPLES

The present invention will be specifically described by way of the following Examples, but the present invention is not limited thereto.

Examples 1 to 11 and Comparative Examples 1 to 3

Compounding materials shown in Tables 1 to 3 are collectively charged into a mixer and mixed at room temperature for 5 minutes to obtain a mixture. The obtained mixture is subjected to the following steps of (i) preforming, (ii) hot molding, heating, and (iii) scorching to produce a friction material.

(i) Preforming

The mixture is charged into a mold of a preforming press and molded at room temperature at 20 MPa for 10 seconds to prepare a preformed body.

(ii) Hot Molding

The preformed body is charged into a hot molding mold, metal plates (pressure plates) coated with an adhesive in advance are stacked, and hot press molding is performed at 150° C. and 50 MPa for 6 minutes.

(iii) Heating, Scorching

The hot-press molded body is heat-treated at 250° C. for 3 hours and then grinded.

Next, the surface of the hot-press molded body is scorched and finished with a painting to obtain the friction material.

The median diameter of trisodium phosphate is 60 μm. The median diameter of tin (IV) sulfide is 30 μm. The average fiber length of the steel fiber is 6 mm, and the average fiber diameter thereof is 250 μm.

The corrosion stiction property and the creep groan property of the friction material obtained in each of Examples 1 to 11 and Comparative Examples 1 to 3 are evaluated according to the following methods. The results are shown in Tables 1 to 3.

Corrosion Stiction Property

Evaluation 1

Using the friction material obtained above, the following operations (1) to (4) are repeated 5 times (5 cycles), and the corrosion stiction force of the friction material after each cycle is measured. A cast iron rotor is used as the mating material.

(1) The friction material is processed into a test piece size, and subjected to friction under the following conditions using a 1/7 scale tester.

Initial speed: 15 km/h

Braking hydraulic pressure: 0.5 MPa

Braking initial rotor temperature: 50° C.

Number of braking: 20 times (2) The friction material and the mating material are immersed in distilled water for 3 minutes.

(3) The friction material and the mating material are clamped with a load of 2.5 kN and left at room temperature for 16 hours.

(4) The clamp is stopped, and the corrosion stiction force of the friction material is measured with a "digital push-pull gauge" manufactured by Aikoh Engineering Co., Ltd., and evaluated based on the following criteria.

A: less than 5 N

B: 5 N or more and less than 30 N

C: 30 N or more and less than 60 N

D: 60 N or more

Evaluation 2

The evaluation is performed in the same manner as in [Evaluation 1] above, except that the braking initial rotor temperature is set to 400° C.

Creep Groan Property

Using a full-size dynamometer, the friction material obtained above is subjected to burnish under the following conditions.
- Initial speed: 30 km/h
- Deceleration: 0.98 m/s²
- Braking interval: 30 seconds
- Number of braking: 4000 times After burnish, the friction material is left for 16 hours in an environment of 23° C. and 95% humidity, sprinkled with water such that the entire friction material is wet, and then left for 20 minutes.

Using a full-size dynamometer, a static friction coefficient (static μ) and a dynamic friction coefficient (dynamic μ) of the friction material after being left in water are measured under the following conditions.
- Hydraulic pressure: 1.0 MPa
- Decompression rate: 0.1 MPa/s
- Creep torque: 200 Nm A difference Δμ (static μ–dynamic μ) between the measured static μ and dynamic μ is determined and evaluated based on the following criteria. The results are shown in Tables 1 to 3.
- A: less than 0.030
- B: 0.030 or more and less than 0.035
- C: 0.035 or more and less than 0.040
- D: 0.040 or more In addition, the duration of vibration generated during the measurement of the static μ and the dynamic μ is measured and evaluated based on the following criteria. The results are shown in Tables 1 to 3.
- A: shorter than 2.5 seconds
- B: 2.5 seconds or longer and shorter than 3.5 seconds
- C: 3.5 seconds or longer and shorter than 4.5 seconds
- D: 4.5 seconds or longer

TABLE 1

| | | | | Example 1 | Example 2 | Example 3 | Example 4 | Example 5 |
|---|---|---|---|---|---|---|---|---|
| | | (mass %) | | | | | | |
| Blending composition | Binder | | Phenol resin | 7.0 | 7.0 | 7.0 | 7.0 | 7.0 |
| | Friction modifier | | Cashew dust | 2.0 | 2.0 | 2.0 | 2.0 | 2.0 |
| | | | Rubber dust | 2.0 | 2.0 | 2.0 | 2.0 | 2.0 |
| | | | Calcium hydroxide | 1.0 | 1.0 | 1.0 | 1.0 | 1.0 |
| | | | Barium sulfate | 20.5 | 20.0 | 18.0 | 16.0 | 14.0 |
| | | | Mica | 3.0 | 3.0 | 3.0 | 3.0 | 3.0 |
| | | | Magnesium oxide | 3.0 | 3.0 | 3.0 | 3.0 | 3.0 |
| | | | Chromium oxide | 3.0 | 3.0 | 3.0 | 3.0 | 3.0 |
| | | | Trisodium phosphate | 0.5 | 1.0 | 3.0 | 5.0 | 7.0 |
| | | | Tin (IV) sulfide | 5.0 | 5.0 | 5.0 | 5.0 | 5.0 |
| | | | Carnauba wax | — | — | — | — | — |
| | | | Zinc powder | 2.0 | 2.0 | 2.0 | 2.0 | 2.0 |
| | | | Graphite | 11.0 | 11.0 | 11.0 | 11.0 | 11.0 |
| | Fibrous material | | Aramid fiber | 5.0 | 5.0 | 5.0 | 5.0 | 5.0 |
| | | | Steel fiber | 35.0 | 35.0 | 35.0 | 35.0 | 35.0 |
| Total (mass %) | | | | 100.0 | 100.0 | 100.0 | 100.0 | 100.0 |
| Measured values | Corrosion stiction force [N] | [Evaluation 1] Rotor temperature: 50° C. | After 1 cycle | 17.1 | 14.8 | 11.8 | 10.3 | 7.3 |
| | | | After 2 cycles | 27.1 | 22.7 | 16.5 | 11.6 | 9.9 |
| | | | After 3 cycles | 33.1 | 27.5 | 23.4 | 17.0 | 14.5 |
| | | | After 4 cycles | 45.1 | 39.1 | 28.1 | 21.7 | 19.4 |
| | | | After 5 cycles | 52.2 | 46.8 | 37.8 | 26.0 | 23.2 |
| | | [Evaluation 2] Rotor temperature: 400° C. | After 1 cycle | 29.4 | 25.8 | 23.7 | 19.9 | 17.1 |
| | | | After 2 cycles | 39.8 | 35.5 | 28.7 | 24.8 | 24.7 |
| | | | After 3 cycles | 43.7 | 41.8 | 34.4 | 28.1 | 27.2 |
| | | | After 4 cycles | 49.2 | 45.2 | 42.4 | 31.9 | 34.5 |
| | | | After 5 cycles | 58.6 | 56.5 | 52.1 | 40.9 | 39.1 |
| | Δμ after being left in water | | | 0.039 | 0.038 | 0.033 | 0.033 | 0.030 |
| | Creep vibration duration [s] | | | 4.3 | 3.9 | 3.1 | 2.8 | 2.5 |
| Evaluation | Corrosion stiction force | [Evaluation 1] Rotor temperature: 50° C. | After 1 cycle | B | B | B | B | B |
| | | | After 2 cycles | B | B | B | B | B |
| | | | After 3 cycles | C | B | B | B | B |
| | | | After 4 cycles | C | C | B | B | B |
| | | | After 5 cycles | C | C | C | B | B |
| | | [Evaluation 2] Rotor temperature: 400° C. | After 1 cycle | B | B | B | B | B |
| | | | After 2 cycles | C | C | B | B | B |
| | | | After 3 cycles | C | C | C | B | B |
| | | | After 4 cycles | C | C | C | C | C |
| | | | After 5 cycles | C | C | C | C | C |
| | Δμ after being left in water | | | C | C | B | B | B |
| | Creep vibration duration | | | C | C | B | B | B |

TABLE 2

| | | | Example | | | | |
|---|---|---|---|---|---|---|---|
| | | (mass %) | 6 | 7 | 8 | 9 | 10 |
| Blending composition | Binder | Phenol resin | 7.0 | 7.0 | 7.0 | 7.0 | 7.0 |
| | Friction modifier | Cashew dust | 2.0 | 2.0 | 2.0 | 2.0 | 2.0 |
| | | Rubber dust | 2.0 | 2.0 | 2.0 | 2.0 | 2.0 |
| | | Calcium hydroxide | 1.0 | 1.0 | 1.0 | 1.0 | 1.0 |
| | | Barium sulfate | 11.0 | 20.0 | 13.0 | 15.8 | 15.0 |
| | | Mica | 3.0 | 3.0 | 3.0 | 3.0 | 3.0 |
| | | Magnesium oxide | 3.0 | 3.0 | 3.0 | 3.0 | 3.0 |
| | | Chromium oxide | 3.0 | 3.0 | 3.0 | 3.0 | 3.0 |
| | | Trisodium phosphate | 10.0 | 5.0 | 5.0 | 5.0 | 5.0 |
| | | Tin (IV) sulfide | 5.0 | 1.0 | 8.0 | 5.0 | 5.0 |
| | | Carnauba wax | — | — | — | 0.2 | 1.0 |
| | | Zinc powder | 2.0 | 2.0 | 2.0 | 2.0 | 2.0 |
| | | Graphite | 11.0 | 11.0 | 11.0 | 11.0 | 11.0 |
| | Fibrous material | Aramid fiber | 5.0 | 5.0 | 5.0 | 5.0 | 5.0 |
| | | Steel fiber | 35.0 | 35.0 | 35.0 | 35.0 | 35.0 |
| Total (mass %) | | | 100.0 | 100.0 | 100.0 | 100.0 | 100.0 |
| Measured values | Corrosion stiction force [N] | [Evaluation 1] Rotor temperature: 50° C. | After 1 cycle | 4.8 | 10.2 | 8.9 | 4.9 | 0.3 |
| | | | After 2 cycles | 6.6 | 14.2 | 13.4 | 8.8 | 3.3 |
| | | | After 3 cycles | 11.2 | 17.8 | 16.5 | 15.1 | 9.2 |
| | | | After 4 cycles | 24.5 | 20.2 | 23.2 | 18.7 | 12.8 |
| | | | After 5 cycles | 18.4 | 28.8 | 30.2 | 24.3 | 17.7 |
| | | [Evaluation 2] Rotor temperature: 400° C. | After 1 cycle | 14.0 | 29.3 | 18.1 | 16.2 | 14.7 |
| | | | After 2 cycles | 20.0 | 36.9 | 22.7 | 24.4 | 14.8 |
| | | | After 3 cycles | 25.1 | 38.8 | 25.6 | 27.4 | 22.1 |
| | | | After 4 cycles | 29.5 | 41.5 | 29.8 | 36.1 | 25.9 |
| | | | After 5 cycles | 30.2 | 48.1 | 40.0 | 33.3 | 35.3 |
| | Δμ after being left in water | | 0.029 | 0.034 | 0.033 | 0.030 | 0.029 |
| | Creep vibration duration [s] | | 2.3 | 2.8 | 2.8 | 2.7 | 2.4 |
| Evaluation | Corrosion stiction force | [Evaluation 1] Rotor temperature: 50° C. | After 1 cycle | A | B | B | A | A |
| | | | After 2 cycles | B | B | B | B | A |
| | | | After 3 cycles | B | B | B | B | B |
| | | | After 4 cycles | B | B | B | B | B |
| | | | After 5 cycles | B | B | C | B | B |
| | | [Evaluation 2] Rotor temperature: 400° C. | After 1 cycle | B | B | B | B | B |
| | | | After 2 cycles | B | C | B | B | B |
| | | | After 3 cycles | B | C | B | B | B |
| | | | After 4 cycles | B | C | B | C | B |
| | | | After 5 cycles | C | C | C | C | C |
| | Δμ after being left in water | | A | B | B | B | A |
| | Creep vibration duration | | A | B | B | B | A |

TABLE 3

| | | | Example | Comparative Example | | |
|---|---|---|---|---|---|---|
| | | (mass %) | 11 | 1 | 2 | 3 |
| Blending composition | Binder | Phenol resin | 7.0 | 7.0 | 7.0 | 7.0 |
| | Friction modifier | Cashew dust | 2.0 | 2.0 | 2.0 | 2.0 |
| | | Rubber dust | 2.0 | 2.0 | 2.0 | 2.0 |
| | | Calcium hydroxide | 1.0 | 1.0 | 1.0 | 1.0 |
| | | Barium sulfate | 12.0 | 26.0 | 21.0 | 21.0 |
| | | Mica | 3.0 | 3.0 | 3.0 | 3.0 |
| | | Magnesium oxide | 3.0 | 3.0 | 3.0 | 3.0 |
| | | Chromium oxide | 3.0 | 3.0 | 3.0 | 3.0 |
| | | Trisodium phosphate | 5.0 | — | 5.0 | — |
| | | Tin (IV) sulfide | 5.0 | — | — | 5.0 |
| | | Carnauba wax | 4.0 | — | — | — |
| | | Zinc powder | 2.0 | 2.0 | 2.0 | 2.0 |
| | | Graphite | 11.0 | 11.0 | 11.0 | 11.0 |
| | Fibrous material | Aramid fiber | 5.0 | 5.0 | 5.0 | 5.0 |
| | | Steel fiber | 35.0 | 35.0 | 35.0 | 35.0 |
| Total (mass %) | | | 100.0 | 100.0 | 100.0 | 100.0 |
| Measured values | Corrosion stiction force [N] | [Evaluation 1] Rotor temperature: 50° C. | After 1 cycle | 0.0 | 31.6 | 11.0 | 23.0 |
| | | | After 2 cycles | 2.4 | 57.2 | 13.7 | 52.3 |
| | | | After 3 cycles | 4.8 | 90.4 | 16.9 | 81.2 |
| | | | After 4 cycles | 8.9 | 124.3 | 19.9 | 107.4 |
| | | | After 5 cycles | 14.8 | 151.8 | 29.0 | 133.6 |

TABLE 3-continued

|  |  |  | Example | Comparative Example | | |
|---|---|---|---|---|---|---|
| (mass %) | | | 11 | 1 | 2 | 3 |
| | [Evaluation 2] | After 1 cycle | 15.4 | 61.7 | 40.9 | 35.7 |
| | Rotor | After 2 cycles | 18.9 | 93.3 | 47.7 | 62.2 |
| | temperature: | After 3 cycles | 18.4 | 120.4 | 66.5 | 97.4 |
| | 400° C. | After 4 cycles | 20.4 | 160.7 | 72.9 | 119.3 |
| | | After 5 cycles | 26.9 | 182.9 | 84.5 | 142.7 |
| | Δμ after being left in water | | 0.025 | 0.044 | 0.033 | 0.043 |
| | Creep vibration duration [s] | | 2.3 | 5.1 | 2.7 | 5.0 |
| Evaluation | Corrosion stiction force | [Evaluation 1] Rotor temperature: 50° C. | After 1 cycle | A | C | B | B |
| | | | After 2 cycles | A | C | B | C |
| | | | After 3 cycles | A | D | B | D |
| | | | After 4 cycles | B | D | B | D |
| | | | After 5 cycles | B | D | B | D |
| | | [Evaluation 2] Rotor temperature: 400° C. | After 1 cycle | B | D | C | C |
| | | | After 2 cycles | B | D | C | D |
| | | | After 3 cycles | B | D | D | D |
| | | | After 4 cycles | B | D | D | D |
| | | | After 5 cycles | B | D | D | D |
| | Δμ after being left in water | | A | D | B | D |
| | Creep vibration duration | | A | D | B | D |

As seen from the results in Tables 1 to 3, the friction materials according to Examples 1 to 11 are friction materials that can prevent the occurrence of the seizure due to corrosion phenomenon even when the friction material has undergone a high temperature heat history (rotor temperature: 400° C.), and can also prevent the occurrence of the creep groan.

Although the present invention has been described in detail with reference to a specific embodiment, it will be apparent to those skilled in the art that various changes and modifications can be made without departing from the spirit and the scope of the present invention. The present application is based on a Japanese Patent Application (Japanese Patent Application No. 2019-53713) filed on Mar. 20, 2019, and the content thereof is incorporated herein as reference.

The invention claimed is:

1. A friction material comprising:
a friction modifier;
a binder; and
a fibrous material, wherein
an alkali metal salt of phosphoric acid and a metal sulfide are contained as the friction modifier,
a median diameter of the alkali metal salt of phosphoric acid is 1 μm to 200 μm,
wherein the metal sulfide is tin (IV) sulfide ($SnS_2$); and
the friction modifier further comprises 4.0 mass % to 24.5 mass % in aggregate of at least two selected from the group consisting of calcium hydroxide, barium sulfate, and mica.

2. The friction material according to claim 1, wherein the alkali metal salt of phosphoric acid includes trisodium phosphate.

3. The friction material according to claim 1, wherein a wax containing, as a main component, an ester of a higher fatty acid and a higher alcohol is contained as the friction modifier.

4. The friction material according to claim 1, wherein a steel fiber is contained as the fibrous material.

5. The friction material according to claim 4, wherein a content of the steel fiber is 20 mass % to 50 mass %.

6. The friction material according to claim 1, wherein a content of a copper component is 0.5 mass % or less in a copper element equivalent.

7. The friction material according to claim 2, wherein a wax containing, as a main component, an ester of a higher fatty acid and a higher alcohol is contained as the friction modifier.

8. The friction material according to claim 2, wherein a steel fiber is contained as the fibrous material.

9. The friction material according to claim 3, wherein a steel fiber is contained as the fibrous material.

10. The friction material according to claim 7, wherein a steel fiber is contained as the fibrous material.

11. The friction material according to claim 8, wherein a content of the steel fiber is 20 mass % to 50 mass %.

12. The friction material according to claim 9, wherein a content of the steel fiber is 20 mass % to 50 mass %.

13. The friction material according to claim 10, wherein a content of the steel fiber is 20 mass % to 50 mass %.

14. The friction material according to claim 7, wherein a content of a copper component is 0.5 mass % or less in a copper element equivalent.

15. The friction material according to claim 8, wherein a content of a copper component is 0.5 mass % or less in a copper element equivalent.

16. The friction material according to claim 10, wherein a content of a copper component is 0.5 mass % or less in a copper element equivalent.

17. The friction material according to claim 13, wherein a content of a copper component is 0.5 mass % or less in a copper element equivalent.

18. The friction material according to claim 4, wherein the steel fiber has an average length greater than or equal to 0.5 mm and less than or equal to 30 mm and an average diameter greater than or equal to 10 μm and less than or equal to 600 μm.

* * * * *